United States Patent [19]

Michio et al.

[11] 4,392,540
[45] Jul. 12, 1983

[54] POWER STEERING DEVICE FOR A VEHICLE

[75] Inventors: Abe Michio, Kasugai; Maeda Naoyuki, Inuyama, both of Japan

[73] Assignee: Tokai TRW & Co., Ltd., Japan

[21] Appl. No.: 221,612

[22] Filed: Dec. 31, 1980

[30] Foreign Application Priority Data

Jul. 16, 1980 [JP] Japan ................................. 55-96967

[51] Int. Cl.³ ............................................. B62D 5/06
[52] U.S. Cl. .................................................. 180/142
[58] Field of Search ................ 180/143, 142, 141, 132

[56] References Cited

U.S. PATENT DOCUMENTS

| | | | |
|---|---|---|---|
| 2,750,742 | 6/1956 | Peterson | 180/155 X |
| 3,991,846 | 11/1976 | Chichester et al. | 180/132 |
| 3,996,742 | 12/1976 | Goff | 180/132 |
| 4,056,160 | 11/1977 | Abels et al. | 180/143 |
| 4,212,366 | 7/1980 | Ohtuka et al. | 180/141 |

FOREIGN PATENT DOCUMENTS

| | | |
|---|---|---|
| 2834283 | 2/1979 | Fed. Rep. of Germany . |
| 2915890 | 11/1980 | Fed. Rep. of Germany . |
| 55-55059 | 4/1980 | Japan ................ 180/143 |
| 1400634 | 7/1975 | United Kingdom . |

Primary Examiner—John A. Pekar
Attorney, Agent, or Firm—Yount & Tarolli

[57] ABSTRACT

A power steering apparatus includes an electric motor which drives a power steering pump. A vehicle speed detector senses the speed of the vehicle. A steering wheel rotation detector senses whether or not the steering wheel is being rotated. At low vehicle speeds, a control assembly effects operation of the electric motor to drive the power steering pump at a relatively low standby angular velocity prior to initiation of a steering operation. Upon initiation and during of the steering operation at low vehicle speeds, the control assembly effects operation of the electric motor to drive the power steering pump at an angular velocity which varies as a function of vehicle speed. When the vehicle is traveling at a relatively high speed, the control assembly causes the electric motor to drive the pump at an angular velocity which is less than the standby angular velocity, that is, at a very low speed or at a standstill. In one embodiment of the invention, rotation of the steering wheel is detected by sensing variations in the output from the power steering pump. In another embodiment of the invention, rotation of the steering wheel is detected by sensing variations in the current conducted to the electric motor which drives the power steering pump.

12 Claims, 10 Drawing Figures

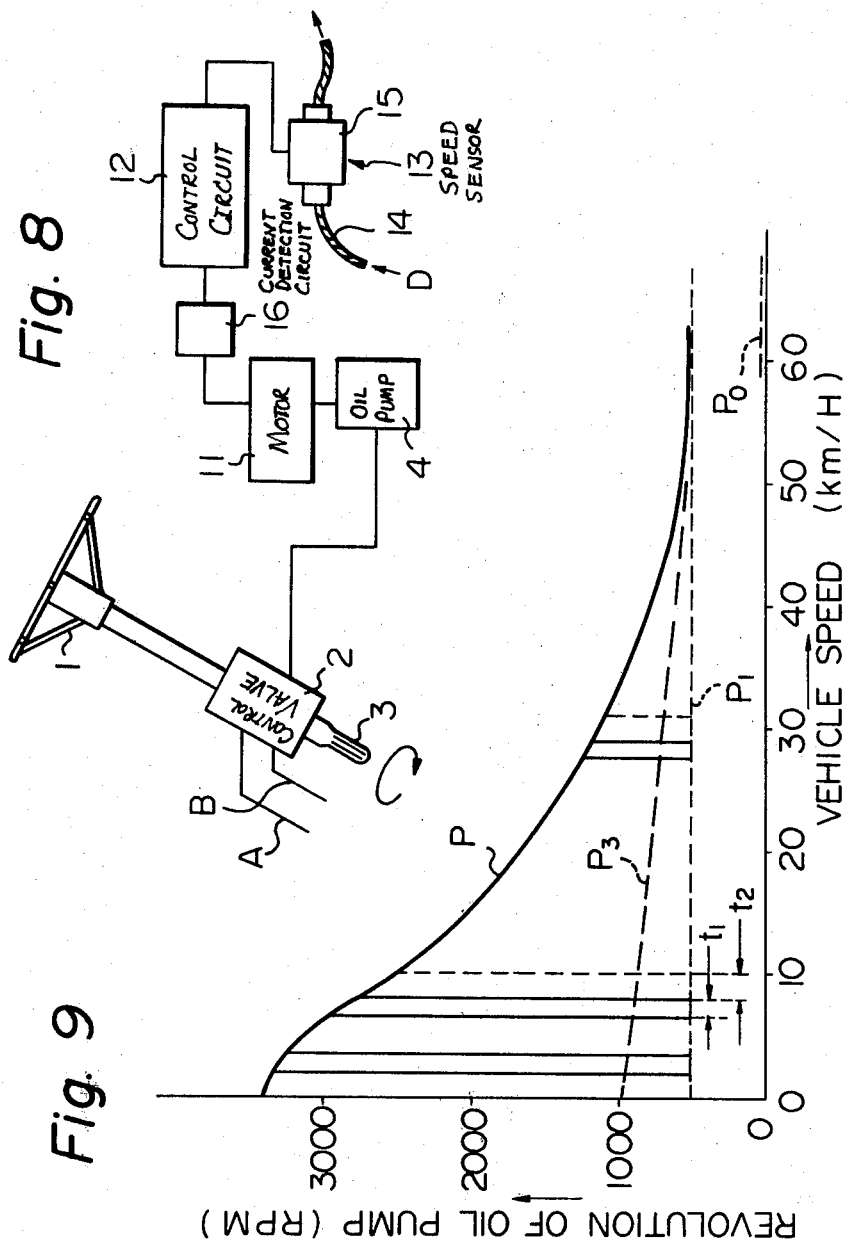

POWER STEERING DEVICE FOR A VEHICLE

BACKGROUND OF THE INVENTION

This invention relates to improvements in a power steering apparatus for use in a vehicle having steerable vehicle wheels.

During operation of a vehicle at relatively low speeds, such as during parking, there is a relatively large resistance to turning movement of steerable vehicle wheels. Therefore, relatively high fluid pressures are desirable to actuate a power steering motor at low vehicle speeds. As vehicle speed increases, the resistance to turning movement of the steerable vehicle wheels decreases. Therefore, the fluid pressure required to actuate the power steering motor decreases as vehicle speed increases. During operation of a vehicle at relatively high speeds, the assistance provided by a power steering motor should be minimized to reduce energy requirements, prevent excessive turning movement of the vehicle wheels in response to small movements of the steering wheel and to provide the operator of the vehicle with a feel for road conditions.

When an operator rotates a steering wheel at low vehicle speeds, the power steering system should respond immediately. If there is a delay in the response of the power steering system to rotation of the steering wheel, the operator will initially feel a substantial resistance to turning of the steering wheel. This initial resistance to steering wheel rotation will disappear as the power steering system becomes effective. The resulting jerkiness in steering wheel rotation will be objectionable and disconcerting to the operator.

Power steering systems in automotive vehicles commonly have an engine driven pump. In power steering systems, maximum steering assist and hence maximum flow from the pumps is required at low vehicle and minimum engine speeds. Thus, a power steering pump requires substantial power at low engine speeds. If the vehicle has a small engine, the load applied to the engine by the power steering pump during low speed operation of the vehicle may cause the engine to stall. Normally, flow is related to pump speed. The product of flow, pressure and speed is related to power. Hence, as pump speed increases, the power required to drive the pump also increases. The additional power must be supplied by the engine and hence results in wasted power consumption and reduced fuel economy. Hence, as pump speed increases, flow also increases. However, since the demand for flow is maximum at low vehicle and engine speeds, the increased flow is superfluous to proper steering assist and is wasted. Thus, during high speed operation of the vehicle, the engine driven power steering pump increases the energy (fuel) required to operate the vehicle.

SUMMARY OF THE INVENTION

Thus, the present invention seeks to provide a power steering device which can eliminate the disadvantages inherent in the prior art power steering devices.

According to the present invention, the oil pump is driven by an electric motor and the rotational speed of the oil pump is controlled depending upon the speed of the vehicle. That is, when the vehicle is running at a lower speed the supply of power fluid which assists the rotation of the steering wheel is increased to allow the steering wheel to rotate easily and when the vehicle is running at a higher speed, the supply of such power fluid is reduced to cause the steering wheel to rotate with greater effort to thereby stabilize the running of the vehicle. Thus, the speed at which the power steering pump is driven during a steering operation varies as an inverse function of variations in vehicle speed. Furthermore, the rotational speed of the oil pump is varied depending upon the vehicle speed only when the steering wheel is rotated so that energy saving can be attained. The variation in rotational speed of the oil pump is effected by controlling the speed of operation of an electric motor which drives the pump.

When the vehicle is being driven at a relatively slow speed and the steerable wheels are not being turned, the power steering pump is driven at a relatively slow standby angular velocity by the electric motor. This tends to minimize the energy required to drive the pump while enabling the power steering system to quickly respond to a demand for fluid upon initiation of a steering operation. The standby angular velocity can be either maintained constant or decreased as vehicle speed increases. When the vehicle obtains a relatively high speeds at which power assisted steering is not required, the power steering pump is either stopped or driven at an angular velocity which is less than standby angular velocity. In one embodiment of the invention, the initiation of a steering operation is detected by detecting a variation in the output of the power steering pump. In another embodiment of the invention, initiation of a steering operation is detected by detecting an increase in the electrical current conducted to the motor which drives the power steering pump.

According to one aspect of the present invention, a new and improved power steering apparatus includes a pump which is driven by an electric motor at an angular velocity which varies with vehicle speed and wherein the pump is driven at a relatively low standby angular velocity to avoid most of the initial effects of accelerating the pumping elements and enable the power steering apparatus to promptly respond to initiation of a steering operation.

Another aspect of this invention is to provide a new and improved apparatus in accordance with the preceding paragraph and wherein the standby angular velocity varies as an inverse function of vehicle speed.

Another aspect of this invention is to provide a new and improved power steering apparatus wherein rotation of a steering wheel is detected by detecting increases in the output of a power steering pump.

According to another aspect of the present invention, initiation of rotation of a steering wheel is detected by detecting an increase in a load current flowing to an electric motor which drives a power steering pump.

According to another aspect of the present invention, an electric motor drives a power steering fluid supply pump at a standby angular velocity when a vehicle is being driven at a speed which is less than a predetermined speed and wherein the electric motor drives the power steering pump at an angular velocity which is less than the standby angular velocity when the vehicle is being driven at a speed above the predetermined speed.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the same in any way.

BRIEF DESCRIPTION OF THE DRAWINGS

FIG. 8 is a diagrammatic view of a third embodiment of the power steering device of the present invention; and FIG. 9 is a curve showing the rotational characteristic of the motor for an oil pump controlled by the power steering device as shown in FIG. 8.

PREFERRED EMBODIMENTS OF THE INVENTION

Figure 1:
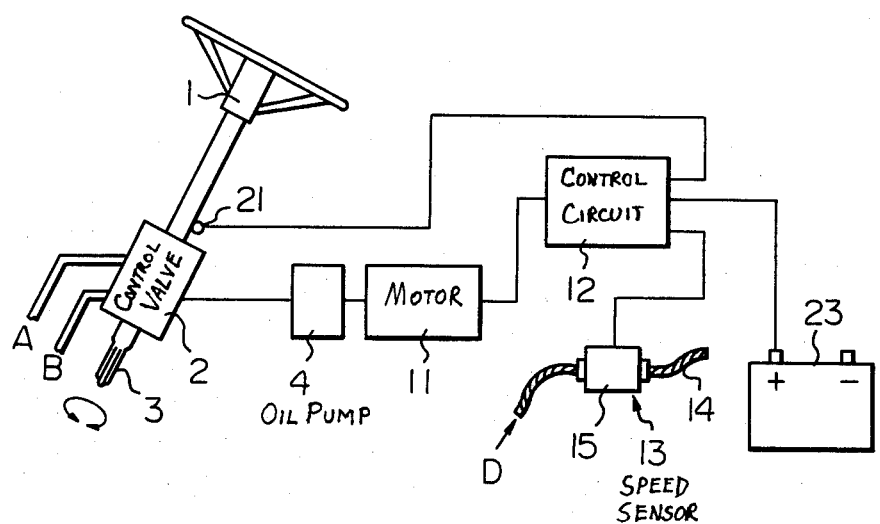
FIG. 1 is a diagrammatic view of a first embodiment of the power steering device of the present invention.

The present invention will be now described in detail referring to the accompanying drawings and more particularly, to FIG. 1 of the drawings in which the first embodiment of the power steering device of the invention is shown. In this Figure, reference numeral 1 denotes a steering wheel and a control valve or servovalve 2 is mounted on a lower portion of the steering post of the steering wheel 1. A pinion gear 3 provided at the lower end of the steering post. The pinion gear 3 is adapted to engage a rack gear (not shown) in a known manner. Operatively connected to the servovalve 2 is an oil pump 4 and a power cylinder (not shown) is operatively connected to the servovalve 2 through lines A and B. The servovalve 2, rack and pinion steering gear, and power steering motor are constructed and interconnected in a known manner, such as is shown in U.S. Pat. No. 3,709,099.

Figure 5A:
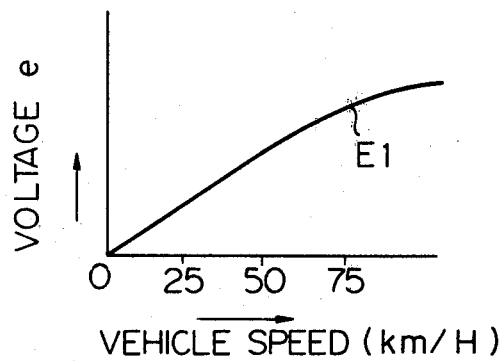
FIGS. 5a and 5b are curves illustrating changes in the output voltages of the vehicle speed detection means incorporated in the above-mentioned two embodiments of the power steering device.

A controller which is adapted to control the oil pump 4 comprises a drive means such as a motor 11, a control circuit 12 for controlling the motor and a vehicle speed detection means 13 operatively connected to the control circuit. The vehicle speed detection means 13 includes a transmission cable 14 connected to a vehicle speed rotation input D and a vehicle speed sensor 15 connected to the transmission cable 14. The vehicle speed from the vehicle speed rotation input D is detected by the vehicle speed sensor 15 through the transmission cable 14 and the vehicle speed sensor generates a vehicle speed analog voltage $E_1$ as shown in FIG. 5a. The analog voltage is fed to the control circuit 12 which in turn controls the motor 11 so that as the voltage increases with increasing vehicle speed, the rotational speed of the motor 11 is reduced. As a result, the rotational angular velocity of the oil pump 4 decreases in proportion to the increase in the vehicle speed. This results in reduction in the amount of oil supplied to the power cylinder as the vehicle speed increases and thus, as the vehicle speed increases, the resistance to the rotation of the steering wheel increases. On the contrary, as the vehicle speed decreases, since the rotational angular velocity of the oil pump 4 increases, the amount of oil supplied to the power cylinder increases to thereby reduce the resistance to the rotation of the steering wheel. As one example of controlling the rotational speed of the motor 11 by the control circuit, a generator may be employed as the vehicle speed sensor 15 and a semiconductor circuit regulator may be employed as the control circuit 12 whereby the voltage generated by the generator controls the regulator so as to control the rotational speed of the motor 11. In another embodiment, the vehicle speed is digitally counted by the sensor and the rotation of the motor is controlled in response to the digitally counted vehicle speed.

In view of the foregoing it is apparent that, upon rotation of the steering wheel 1, the electric motor 11 drives the pump 4 at an angular velocity which is greater than the standby angular velocity and which varies as an inverse function of variations in vehicle speed. Thus, during a steering operation when the vehicle is traveling at a speed of approximately 1 km/hr, the motor 11 drives the pump 4 at an angular velocity of approximately 4,000 rpm (see curve $P_2$ in FIG. 6). During a steering operation when the vehicle is traveling at a speed of approximately 25 km/hr, the motor 11 drives the pump 4 at an angular velocity of approximately 3,000 rpm (see curve $P_2$ in FIG. 6).

Figure 2:
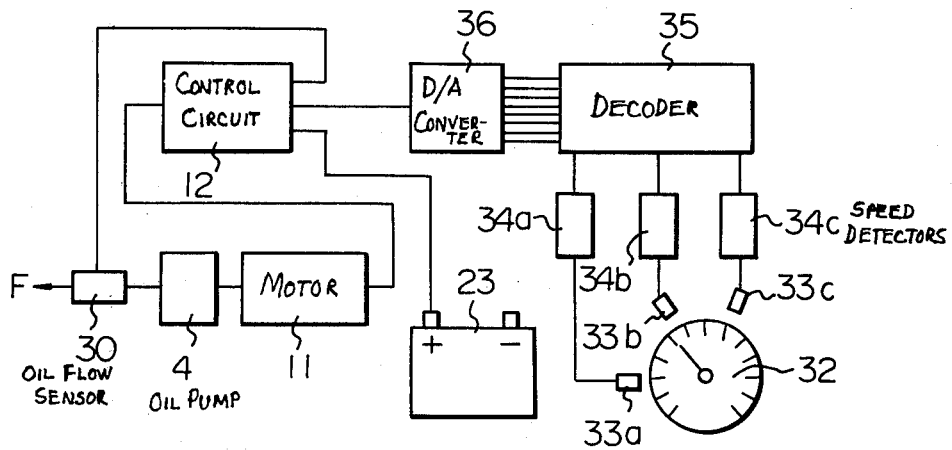
FIG. 2 is a diagrammatic view of a second embodiment of the power steering device of the present invention.

According to the present invention, in order to control the oil pump when the steering is effected or the wheel is rotated, the controller is provided with an energization means (not shown). The energization means comprises a sensor 21 mounted on the post of the steering wheel 1 for detecting the rotational operation or steering force and an amplifier circuit (not shown) which is adapted to amplify an electrical signal from the sensor 21 which may incorporate a delay switching circuit therein. The detected voltage from the sensor 21 serves as a switching signal, for example, which controls the input to be applied from the vehicle speed sensor 15 to the control circuit 12. As for the sensor 21, an arrangement in which the steering post rotates a small-type motor, a torsional sensor (load cell), an arrangement in which the phase relationship between the steering post and servovalve is detected by a voltage, for example, a durable sensor such as a photosensor employing a light source or an approach sensor employing a magnetic field or an oscillatory sensor employing an eddy current is preferably employed. In a rack-pinion type steering, a sensor may be disposed at the back of a rack. Initiation of a steering operation is detected by the sensor when the rack is moved. When the output from the amplifier circuit is transmitted to the control circuit as the steering wheel 1 is rotated, the control of the rotational angular velocity of the oil pump is initiated in response to the vehicle speed as mentioned hereinabove. In FIGS. 1 and 2, reference numeral 23 denotes a vehicle mounted power source connected to the controller at circuit 12.

Many known power steering systems have pumps which are driven by the engine of a vehicle. When the vehicle engine is relatively small, the load applied to the engine by the power steering pump may tend to cause the engine to stall at relatively low engine operating speeds. However the power steering apparatus of FIG. 1 uses the motor 11 to drive the pump 4 independently of the vehicle engine to thereby reduce any tendency for the engine to stall at low vehicle operating speeds. Since the motor 11 can drive the pump 4 at a high angular velocity, the pump 4 can be relatively small.

Prior to initiation of a steering operation, the motor 11 continuously drives the pump 4 at a constant and relatively low standby angular velocity. Since the pump is operating at a relatively low standby angular velocity before the steering operation is undertaken, many of the components of the pump are in motion and the control valve 2 is supplied with fluid pressure. Therefore, the electric motor 11 can quickly increase the operating speed of the pump 4 to supply fluid at the necessary pressure to operate the power steering motor upon initiation of a steering operation.

Figure 3:
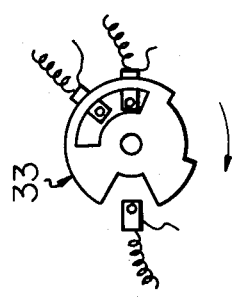
FIG. 3 is a fragmentary plan view of one embodiment of the high speed detection encoder incorporated in the device showing the pulse generation section therein.
Figure 4:
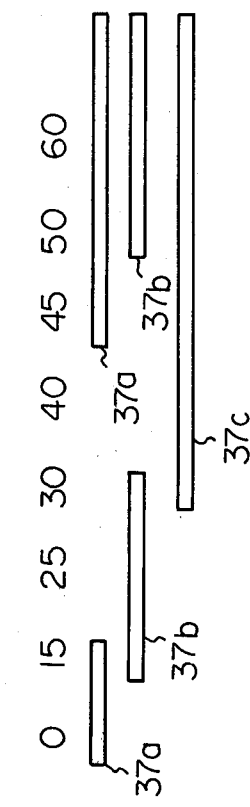
FIG. 4 is an electrical pulse chart provided by the encoder of FIG. 3.
Figure 5B:
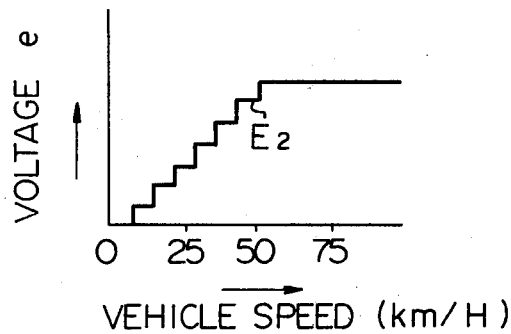

FIG. 2 shows the second embodiment of the power steering device of the present invention and in the second embodiment, the various sensors perform their detection functions in a manner different from that of the sensors incorporated in the first embodiment, but the motor is controlled in the manner as mentioned hereinabove in connection with the first embodiment. In this embodiment, the oil pump output F connected to the servovalve 2 is adapted to be converted into a predetermined electric signal which actuates the controller, by a servovalve operated oil flow pressure sensor 30 (operated in response to an oil flow rate or pressure) adapted to detect the movement of fluid when the steering wheel is rotated. On the other hand, for detecting the vehicle speed, a slitted disc 33 provided on a vehicle speed meter 32 and associated vehicle speed digital sensors 33a, 33b and 33c as shown in FIG. 3 produce digital vehicle speed signals and vehicle speed detectors 34a, 34b and 34c produce digital vehicle speed outputs 37a, 37b and 37c, respectively in the form of electrical signals as shown in FIG. 4. These signals are supplied to a level decoder 35 which in turn produces vehicle speed pulses at eight different levels. The vehicle speed pulses are supplied to a digital-analog-converter 36 which in turn produces an eight-stepped digital voltage $E_2$ for controlling the motor speed as shown in FIG. 5b.

Figure 6:
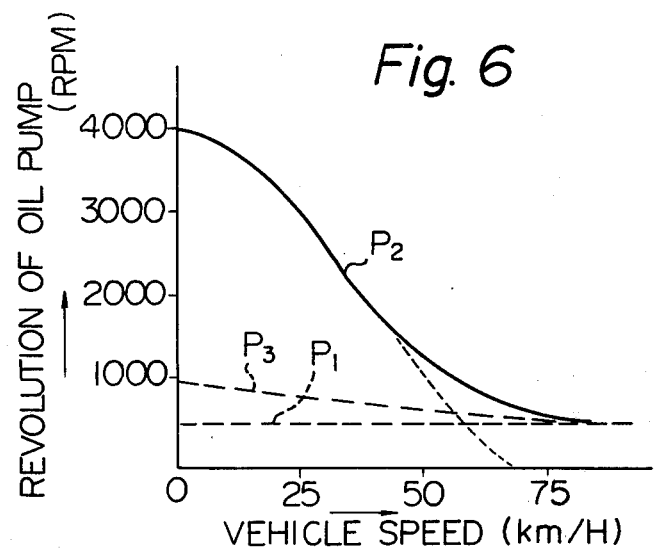
FIGS. 6 and 7 are curves showing the rotational characteristic of the motor for an oil pump controlled by the abovementioned two embodiments of the power steering device.
Figure 7:
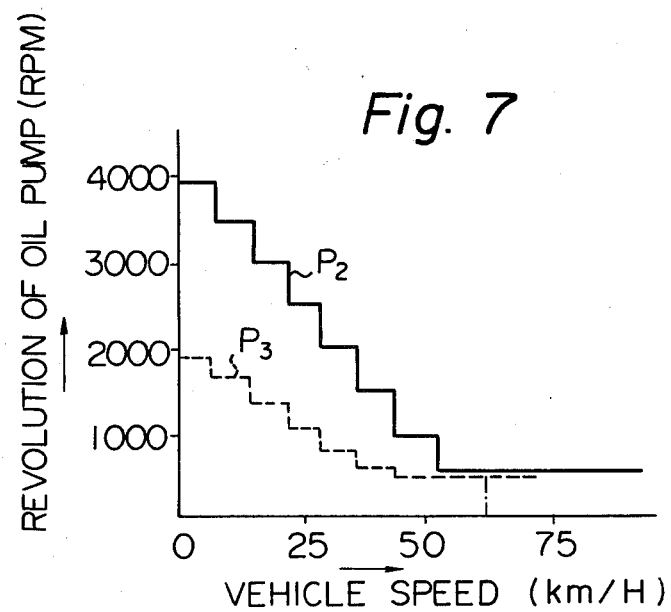

Thus, according to the present invention, the electrical signals from the two systems of vehicle speed and steering wheel rotation sensing means can control the rotation of the motor 11 as shown in FIGS. 6 and 7. That is, FIG. 6 shows the angular velocity of the oil pump with respect to the vehicle speed in the embodiment as shown in FIG. 1. FIG. 7 shows the angular velocity of the oil pump with respect to the vehicle speed in the embodiment as shown in FIG. 2, respectively. When the steering wheel is not rotated, the motor is normally maintained at a low standby speed level such as $P_1$ so that the oil pump will not waste fluid energy whereas during the time the steering wheel is being rotated or for a predetermined time period after the termination of the steering wheel rotation, the motor is rotated to the controlled rotation speed level of $P_2$ depending upon the then running speed of the vehicle to operate the oil pump which in turn pumps fluid to the power cylinder through the output lines A and B to thereby augment the rotational force applied to the steering wheel. Thereat when the steering wheel is not rotated, the motor is rotated at a low standby speed, and only when the steering wheel is rotated, the oil pump speed increased to a relatively high speed. This relatively high oil pump operating speed is reduced as the vehicle increases its speed as shown at $P_2$ in FIGS. 1 and 2.

If desired, the standby angular velocity at which the motor 11 drives the oil pump 4 may be varied as an inverse function of vehicle speed. Thus when the vehicle is at a standstill or traveling very slowly, the motor 11 may drive the pump at a standby angular velocity of approximately 1000 RPM's as indicated by the left ends of the curves $P_3$ in FIGS. 6 and 7. As the vehicle speed increases, the standby angular velocity is decreased to approximately 500 RPM's (see the curve $P_3$ in FIGS. 6 and 7). The foregoing pump operating speeds have been set forth only for purposes of clarity of illustration and it is not intended to be limited to any specific pump operating speed.

FIGS. 8 and 9 show the third embodiment of the power steering device of the present invention. The third embodiment is substantially identical with the first embodiment except for the fact that in order to control the oil pump, a current detection means or circuit 16 is employed in place of the energization means employed in the first embodiment. The current detection means or circuit 16 is interposed between the motor 11 and controller 12 in the power steering system and is adapted to detect the steering load current flowing through the motor 11 when the steering operation is effected or the steering wheel 1 is rotated. The current detection means in the form of an electronic circuit interposed between the motor 11 and controller 12 in the conventional main current circuit to compute the steering load current flowing through the motor 11. The signal from the current detection means 16 serves as a gate signal which controls the input fed to the controller 12 by the vehicle speed sensor 15.

Thus, in the third embodiment of the power steering device described just above, electrical signals from the vehicle speed sensor 13 and the current detection means adapted to detect the rotation of the steering wheel can control the rotation of the motor 11 as shown in FIG. 9. That is, FIG. 9 shows the rotational characteristic of the oil pump with respect to vehicle speed. When the steering wheel is not rotated ($P_0$), the oil pump normally continues to rotate at low rate or standby speed ($P_1$) until the vehicle speed increases up to 60 km/h, for example, but when the vehicle speed exceeds the predetermined value, the motor 11 is normally maintained at a further reduced rotation rate or standstill so that the motor will not waste energy. During the time the steering wheel is being rotated or for a predetermined time period after the steering wheel has terminated its rotation, the control circuit rotates the motor at a rate along the curve P (FIG. 9) depending upon the then running speed of the vehicle and fluid is pumped to the power cylinder through the output lines A and B to thereby augment the rotational output of the steering wheel. In this case, when the steering current detection means 16 is provided with time means such as a time constant circuit, for example, and the time means is so set that the pumps ceases its operation after a time lag of $t_2$ after the rotation of the steering wheel for the time period of $t_1$, for example, has terminated while the steering wheel is being continuously rotated as the vehicle runs along a long curve on an expressway, the oil pump automatically maintains its operation to augment the rotational output of the steering wheel. Similarly to the above embodiments, the rotational speed of the oil pump may be reduced as shown at $P_3$ in FIG. 9, as the vehicle speed increases, when the steering wheel is rotated.

During operation of the vehicle at speeds less then a predetermined speed, for example, 60 km/h, the motor 11 continuously drives the pump 4 at relatively low standby angular velocity prior to initiation of a steering operation. This standby angular velocity can either be maintained constant, as indicated by the line $P_1$ in FIG. 9, or decreased as vehicle speed increases, as indicated by the line $P_3$ in FIG. 9. When the vehicle speed exceeds a predetermined speed, the angular velocity at which the motor 11 drives the pump 4 is reduced from the standby angular velocity to a relatively low angular velocity indicated at $P_0$ in FIG. 9, or the motor may be de-energized so that the pump is at a standstill.

As mentioned hereinabove, according to the present invention, by operating the motor at a high speed through the battery independently of the vehicle running speed, the rotation rate and discharge capacity of the oil pump can be increased and thus, even if the volume of the oil pump is reduced to a fraction of that of the prior art oil pumps, the oil pump can fully supply the amount of oil required by the power cylinder when the vehicle is steered to thereby make it possible to reduce the size and weight of the oil pump. When the steering wheel is not rotated, the oil pump is normally controlled to operate at a low speed or remain at a standstill to thereby reduce energy consumption and/or reduce wear on the brush of the oil pump motor resulting in the extension of the service life of the brush. Test results on fuel consumption by vehicles show that the electrically driven- and steering load current detection-oil pressure type power steering system as shown at least 4% reduction of fuel consumption as compared with conventional power steering both when the vehicle is running on expressways and on ordinary roads.

While several embodiments of the invention have been shown and described in detail, it will be understood that the same are for illustration only and are not to be taken as a definition of the invention, reference being had for this purpose to the appended claims.

What is claimed is:

1. An apparatus for operating a hydraulic ram and turning a steerable vehicle wheel in response to rotation of a steering wheel, said apparatus comprising a hydraulic pump for supplying hydraulic fluid to said ram, electric motor means for driving said pump, a vehicle speed sensor, a steering wheel rotation sensor, and electrical control means connected to said electric motor means and responsive to signals from said vehicle speed sensor and steering wheel rotation sensor for controlling the angular velocity at which said electric motor means drives said pump, said control means including means for energizing said electric motor means to drive said pump at a relatively low standby angular velocity and during rotation of the steering wheel causing said electric motor means to drive said pump at an angular velocity which is greater than the standby angular velocity and which varies as an inverse function of vehicle speed.

2. An apparatus as set forth in claim 1 wherein said control means further includes means responsive to increasing vehicle speed for causing said electric motor means to operate said pump at an angular velocity below the standby angular velocity at vehicle speeds above a predetermined speed.

3. An apparatus as set forth in claim 2 wherein said means for causing said electric motor means to operate said pump at an angular velocity which is less than the standby angular velocity includes means for de-energizing said electric motor means at vehicle speeds above the predetermined speed.

4. An apparatus as set forth in claim 1 wherein said steering wheel rotation sensor includes means for detecting variations in the fluid pressure of the output from said pump.

5. An apparatus as set forth in claim 1 wherein said steering wheel rotation sensor includes means for detecting variations in an electrical current conducted to said electric motor means.

6. An apparatus as set forth in claim 1 wherein said control means includes means for maintaining the speed at which said electric motor means drives said power steering fluid pump at a speed above the standby speed for a predetermined time period after termination of rotation of the steering wheel.

7. An apparatus for operating a power steering motor and turning a steerable vehicle wheel in response to rotation of a steering wheel, said apparatus comprising a pump, an electric motor connected with said pump for driving said pump to supply hydraulic fluid to the power steering motor, a vehicle speed sensor, a steering wheel rotation sensor, said steering wheel rotation sensor including means for sensing variations in a characteristic of the flow of fluid from said pump, and control means connected with said electric motor means, vehicle speed sensor and steering wheel rotation sensor for varying the angular velocity at which said electric motor means drives said pump, said control means including means for causing said electric motor means to drive said pump at an angular velocity which varies as an inverse function of vehicle speed in response to a variation in the sensed characteristic of the flow of fluid from said pump.

8. An apparatus as set forth in claim 7 wherein said means for sensing variations in a characteristic of the flow of fluid from said pump includes means for sensing variations in the amount of flow of fluid from said pump.

9. An apparatus as set forth in claim 7 wherein said means for sensing variations in a characteristic of the flow of fluid from said pump includes means for sensing variations in the pressure at which fluid is discharged from said pump.

10. An apparatus as set forth in claim 7 wherein said control means further includes means for effecting operation of said electric motor means to drive said pump at a relatively low standby angular velocity prior to and after rotation of the steering wheel.

11. A power steering apparatus for use in turning a steerable vehicle wheel in response to rotation of a steering wheel, said apparatus comprising a pump for supplying hydraulic fluid, a variable speed electric motor connected with said pump for driving said pump, conductor means for conducting an electrical current to said electric motor, a vehicle speed sensor, a steering wheel rotation sensor, said steering wheel rotation sensor including means for detecting variations in the electrical current conducted to said electric motor, and control means connected with said electric motor, vehicle speed sensor and steering wheel rotation sensor for varying the angular velocity at which said electric motor drives said pump, said control means including means for causing said electric motor to drive said pump at an angular velocity which varies as an inverse function of variations in vehicle speed in response to variations in the electrical current conducted to said electric motor.

12. An apparatus as set forth in claim 11 wherein said control means further includes means for causing said electric motor to drive said pump at a relatively low standby angular velocity prior to and after rotation of the steering wheel.

* * * * *